(12) United States Patent
Kato

(10) Patent No.: US 10,880,450 B2
(45) Date of Patent: Dec. 29, 2020

(54) IMAGE PROCESSING APPARATUS

(71) Applicant: TOSHIBA TEC KABUSHIKI KAISHA, Tokyo (JP)

(72) Inventor: Hiroyuki Kato, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/745,073

(22) Filed: Jan. 16, 2020

(65) Prior Publication Data

US 2020/0153990 A1 May 14, 2020

Related U.S. Application Data

(63) Continuation of application No. 16/542,796, filed on Aug. 16, 2019, now Pat. No. 10,554,838, which is a
(Continued)

(30) Foreign Application Priority Data

Dec. 22, 2017 (JP) .................................. 2017-246195

(51) Int. Cl.
*H04N 1/00* (2006.01)
*G06F 3/12* (2006.01)
*G06F 9/44* (2018.01)

(52) U.S. Cl.
CPC .......... *H04N 1/00832* (2013.01); *G06F 3/12* (2013.01); *G06F 9/44* (2013.01); *H04N 1/0035* (2013.01);
(Continued)

(58) Field of Classification Search
None
See application file for complete search history.

(56) References Cited

U.S. PATENT DOCUMENTS

| 2014/0282490 | A1‡ | 9/2014 | Shinomiya | ................ G06F 8/61 717/17 |
| 2015/0156348 | A1‡ | 6/2015 | Kittaka | .............. H04N 1/00307 358/1.14 |
| 2017/0078293 | A1‡ | 3/2017 | Han | ......................... G06F 8/61 |

FOREIGN PATENT DOCUMENTS

| EP | 2 407 878 A1 | 1/2012 |
| EP | 3 419 271 A1 | 12/2018 |

(Continued)

OTHER PUBLICATIONS

Non-Final Office Action on U.S. Appl. No. 16/054,564 dated Jan. 14, 2019.

(Continued)

*Primary Examiner* — Lennin R Rodriguezgonzalez
(74) *Attorney, Agent, or Firm* — Foley & Lardner LLP

(57) ABSTRACT

An image processing apparatus includes at least one of an image forming device configured to form an image on a sheet or an image reader configured to read an image on the sheet, and a storage configured to store information. The apparatus also includes a display configured to display a screen, and a controller. The controller is configured to install an application program relating to the image forming device or the image reader, determine whether to display an execution instruction image for inputting an execution instruction of the installed application program on an individual home screen which is a home screen for individual use by each user, and display the individual home screen containing the execution instruction image determined to be displayed on the display.

14 Claims, 8 Drawing Sheets

Related U.S. Application Data continuation of application No. 16/054,564, filed on Aug. 3, 2018, now Pat. No. 10,419,630.

(52) U.S. Cl.
CPC ....... *H04N 1/0097* (2013.01); *H04N 1/00501* (2013.01); *H04N 1/00509* (2013.01); *H04N 1/00511* (2013.01); *H04N 1/00514* (2013.01); *H04N 1/00408* (2013.01); *H04N 1/00413* (2013.01); *H04N 1/00464* (2013.01); *H04N 1/00517* (2013.01)

(56) References Cited

FOREIGN PATENT DOCUMENTS

| | | |
|---|---|---|
| JP | 2012-165326 A | 8/2012 |
| JP | 2017-122963 A | 7/2017 |

OTHER PUBLICATIONS

Notice of Allowance on U.S. Appl. No. 16/054,564 dated May 3, 2019.
Notice of Allowance on U.S. Appl. No. 16/542,796 dated Sep. 25, 2019.
Search Report dated Apr. 26, 2019 received in corresponding European application No. 18 21 4127.5, 9 pages.

‡ imported from a related application

FIG.9

|  | ADMINISTER | USER 1 | USER 2 | USER 3 |
|---|---|---|---|---|
| COPY EXECUTION PERMISSION | O | O | X | O |
| SCANNING EXECUTION PERMISSION | O | X | O | O |
| PRINTING EXECUTION PERMISSION | O | X | O | X |
| Fax TRANSMISSION EXECUTION PERMISSION | O | X | X | X |

FIG.10

```
<?xml version="1.0" encoding="UTF-8"?>
<AppProperties xmlns="http://www.xxxxxxxxxx.co.jp/xxxx/package">
    <AppId>aaaaaaaa-bbbb-cccc-dddd-123456789012</AppId>
    <AppName>Copy App</AppName>
    <AppVersion>1.0.0</AppVersion>
    <AppCreatedDate>2017-07-17</AppCreatedDate>
    <AppSummary>Copy embedded MFP application</AppSummary>
    <AppButtonName1>Copy Application</AppButtonName1>
    <AppButtonName2></AppButtonName2>
    <IsAutoButtonRegistration>True</IsAutoButtonRegistration>
    <PermissionForButtonRegistration>
        <Copy>True</Copy>
        <Scan>False</Scan>
        <Print>False</Print>
        <SendFax>False</SendFax>
    </PermissionForButtonRegistration>
</AppProperties>
```

IMAGE PROCESSING APPARATUS

CROSS-REFERENCE TO RELATED APPLICATIONS

This application is a continuation of and claims priority to U.S. patent application Ser. No. 16/542,796 filed Aug. 16, 2019, which is a continuation of and claims priority to U.S. patent application Ser. No. 16/054,564 filed Aug. 3, 2018 (issued as U.S. Pat. No. 10,419,630), which in turn is based upon and claims the benefit of priority from Japanese Patent Application No. 2017-246195, filed Dec. 22, 2017, the entire contents of all of which are incorporated herein by reference.

FIELD

Embodiments described herein relate generally to an image processing apparatus.

BACKGROUND

If an application program (hereinafter, referred to as an "app") is installed on a smart phone, an app button may be automatically registered on a home screen. The app button is an image displayed for executing the installed app. If it is detected that a user touches a display area of the app button, the smart phone executes the application.

The automatic registration of the app button is performed as the smart phone is a device for individual use. In other words, the user of the app installed on the smart phone is identical to the user of the smart phone. On the other hand, an MFP (Multi-Function Peripheral) is shared by many users. The MFP does not automatically register the app button after the app is installed. An administrator of the MFP manually registers the app button on the home screen for each user as required. Alternatively, the user may manually register the app button on the home screen. This is because there is a case in which the administrator may limit the user of the app, or the installed app is not necessarily used by all users. However, manual registration of the app button may lead to complicated work.

DESCRIPTION OF THE DRAWINGS

FIG. 9 is a diagram illustrating a setting example of user information;

FIG. 10 is a diagram illustrating an example of a metadata setting of an app;

DETAILED DESCRIPTION

Figure 1:
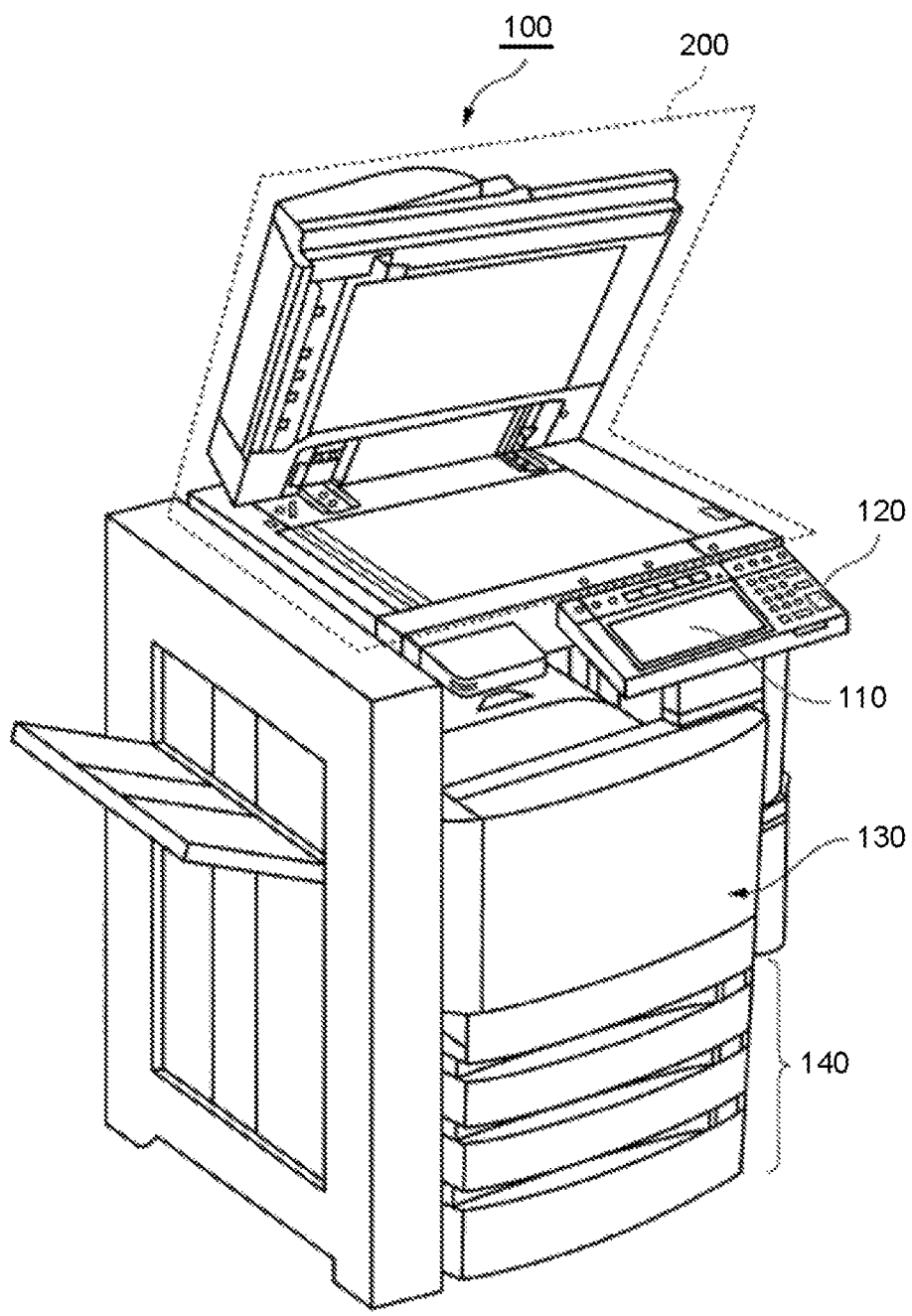
FIG. 1 is an external view illustrating an example of the overall configuration of an image processing apparatus according to at least one embodiment.

In accordance with at least one embodiment, an image processing apparatus comprises at least one of an image forming device configured to form an image on a sheet and an image reading device configured to read an image on the sheet; a storage device configured to store information; a display device configured to display a screen; and a controller configured to install an application program relating to the image forming device or the image reading device, determine whether to display an execution instruction image for inputting an execution instruction of the installed application program on an individual home screen which is a home screen for individual use by each user, and display the individual home screen containing the execution instruction image determined to be displayed on the display device.

Hereinafter, an image processing apparatus according to the embodiment will be described with reference to the accompanying drawings.

First, the outline of the image processing apparatus of the embodiment is described. The image processing apparatus is, for example, a MFP. After installing an application program (hereinafter, also referred to as an "app"), the image processing apparatus automatically registers an execution instruction image of the installed app on the home screen of the user who needs the app. The execution instruction image is displayed on a screen such that the user inputs an execution instruction of the app. Hereinafter, an example in which the execution instruction image is an app button is described.

The image processing apparatus of the embodiment automatically registers the app button as follows.

(1) The image processing apparatus stores information of permission of a user. After the app is installed, the image processing apparatus registers the app button of the installed app on the home screen for a user who has the necessary permission. If the permission is not set, the image processing apparatus registers the app button on the home screen for all users.

(2) The image processing apparatus previously stores the setting about whether to automatically register the app button on the home screen after the app is installed. If the automatic registration is set, the image processing apparatus executes the above (1) to register the app button on the home screen for the user. The image processing apparatus does not register the app button on any home screen for the user if the automatic registration is not set.

(3) The metadata (attribute data) of an app package may include information relating to the permission of the app button registration target. The app package is a file in which a plurality of files relating to the app is collected. For example, the app package includes metadata, an application program (app), data to be referred to by the app, and image data of the app button. After the app using the app package is installed, the image processing apparatus registers the app button on the home screen of the user who has the permission described in the metadata.

(4) The image processing apparatus previously stores priority setting about which one of the setting of the image processing apparatus and the setting of the metadata of the app package is prioritized. After the app is installed, the image processing apparatus performs the registration processing of the app button according to the setting of the image processing apparatus or the setting of metadata of the app package which is prioritized.

Below, the details of the image processing apparatus of at least one embodiment are described.

FIG. 1 is an external view illustrating an example of the overall configuration of an image processing apparatus 100 according to the embodiment. The image processing apparatus 100 shown in FIG. 1 is a MFP. The image processing apparatus 100 includes a display 110, a control panel 120, a printer 130, a sheet housing section 140, and an image reading section (image reader) 200. The printer 130 of the image processing apparatus 100 may be a device for fixing a toner image or an inkjet type device.

The image processing apparatus 100 reads an image on a sheet and generates digital data to generate an image file. The sheet is, for example, a document, a paper on which characters or images are recorded, or the like. The sheet may be any object as long as it can be read by the image processing apparatus 100. The image processing apparatus 100 forms an image on the sheet using a developer such as a toner. The sheet in this case is, for example, a paper or a label paper. The sheet may be any object as long as the image processing apparatus 100 can form an image on a surface thereof.

The display 110 is an image display device such as a liquid crystal display, an organic EL (Electro Luminescence) display and the like. The display 110 displays various information relating to the image processing apparatus 100.

The control panel 120 includes a plurality of buttons. The control panel 120 receives an operation by a user. The control panel 120 outputs a signal corresponding to an operation carried out by a user to a controller of the image processing apparatus 100. Furthermore, the display 110 and the control panel 120 may integrally form a touch panel.

The printer 130 is an image forming device. The printer 130 forms an image on a sheet based on image information generated by the image reading section 200 or image information received via a communication path. The printer 130 forms the image through, for example, the following process. An image forming section of the printer 130 forms an electrostatic latent image on a photoconductive drum based on the image information. The image forming section of the printer 130 enables a developer to adhere to the electrostatic latent image to form a visible image. Toner is an example of the developer. A transfer section of the printer 130 transfers the visible image onto the sheet. A fixing section of the printer 130 heats and pressurizes the sheet to fix the visible image on the sheet. Furthermore, the sheet on which the image is formed may be a sheet housed in the sheet housing section 140 or a manually fed sheet.

The sheet housing section 140 accommodates the sheet used for the image formation by the printer 130.

The image reading section 200 reads the image information which is a reading object as intensity of light. The image reading section 200 records the read image information. The recorded image information may be sent to another information processing apparatus via a network. The recorded image information may be used for the printer 130 to form the image on the sheet.

Figure 2:
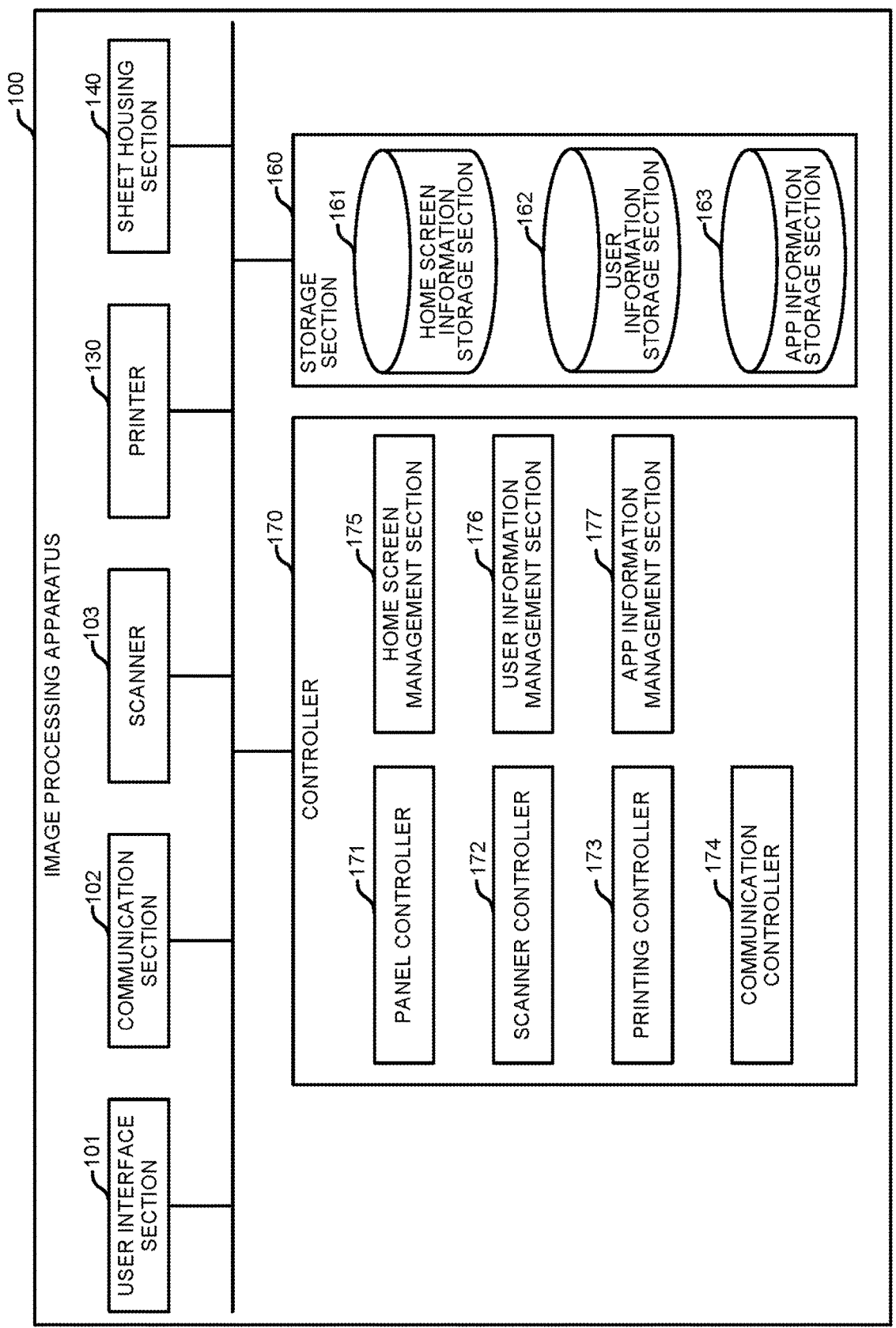
FIG. 2 is a functional block diagram of the image processing apparatus.

FIG. 2 is a functional block diagram of the image processing apparatus 100 according to the embodiment. The image processing apparatus 100 comprises a user interface section 101, a communication section 102, a scanner 103 (image reading device), the printer 130, the sheet housing section 140, a storage section 160, and a controller 170.

Since the configurations of the printer 130 and the sheet housing section 140 are as described above, the description thereof is omitted.

The user interface section 101 performs input by an operation of a user and output of information to the user. The user interface section 101 is realized by the display 110 and the control panel 120 in FIG. 1. Hereinafter, an example in which the user interface section 101 is the touch panel in which the display 110 and the control panel 120 are integrated with each other is described.

The communication section 102 is a network interface. The communication section 102 communicates with an information processing apparatus via a communication path. The information processing apparatus is, for example, a personal computer, a server, a communication device having a fax (facsimile) function, or the like.

The scanner 103 reads an image on the sheet. The scanner 103 is realized by the image reading section 200 in FIG. 1.

The storage section 160 is a storage device such as a HDD (Hard Disk Drive), for example. The storage section 160 stores programs and various data. The storage section 160 includes a home screen information storage section 161, a user information storage section 162, and an app information storage section 163.

The home screen information storage section 161 stores MFP setting information. The MFP setting information includes information relating to an app button automatic registration setting, a user permission setting and a priority setting. The app button automatic registration setting indicates whether to automatically register the app button on the home screen after the app is installed. The user permission setting indicates whether the setting that the user permission is necessary for the automatic registration of the app button is enabled or disabled. If the setting is enabled, the user permission setting further includes information relating to the permission of the user necessary for the automatic registration of the app button. The priority setting indicates whether the automatic registration of the app button is performed according to the MFP setting information that is prioritized or performed according to the attribute data of an app that is prioritized.

Furthermore, the home screen information storage section 161 stores home screen management information of both the shared home screen and the individual home screen. The shared home screen is a home screen common to many users. The individual home screen is a home screen for the individual user. The home screen management information includes information obtained by associating app identification information, app button display position information, app button image identification information, and app button name. The app identification information uniquely identifies the app. The app button display position information indicates a position at which the app button is displayed on the home screen. If the home screen has a plurality of pages, the app button display position information includes information of a page on which the app button is displayed. The app button image identification information uniquely identifies the app button image. The app button image is image data of the app button. The home screen management data may include the app button image instead of the app button identification information.

The user information storage section 162 stores user information. The user information indicates user attributes of the administrator and respective users. The user attribute includes a permission of the user. The permission includes a copy execution permission, a scanning execution permission, a printing execution permission, and a Fax transmission execution permission.

The app information storage section 163 stores the app package. The app package includes the app identification information, the metadata, the application program, the data to be referred to by the app, the app button image identification information, the app button image specified by the app button image identification information, and the app button name. The app identification information may be contained in the metadata or the application program. The app button name may be contained in the metadata. The app package may include a plurality of app button images having different display sizes.

The controller 170 controls each section. The controller 170 includes a processor, a memory, and a HDD. The processor is, for example, a CPU (Central Processing Unit). The memory stores data to be directly referred to when the processor executes a process. For example, the memory is a RAM (Random Access Memory). The processor operates as the controller 170 by reading the program from the storage section 160 and executing it. The controller 170 includes a panel controller 171, a scanner controller 172, a printing controller 173, a communication controller 174, a home screen management section 175, a user information management section 176, and an app information management section 177.

The panel controller 171 controls the display on the touch panel. The panel controller 171 displays the shared home screen and the individual home screen on the touch panel based on the home screen management information stored in the home screen information storage section 161. Specifically, the panel controller 171 reads out the app identification information, the app button display position information, the app button image identification information, and the app button name of each app button to be displayed on the home screen from the home screen management information. The panel controller 171 reads out the app identification information and the app button image specified by the app button image identification information from the app information storage section 163. The panel controller 171 generates the home screen by combining a screen format of the home screen, the app button display image positioned based on the app button display position information, and the app button name. The display position of the app button name is a predetermined position on or around the app button display image. The panel controller 171 displays the generated home screen on the touch panel.

The panel controller 171 detects an operation performed by the user on the touch panel. The panel controller 171 detects that the user presses the app button on the home screen, and outputs an execution instruction of the app. The controller 170 starts executing the app that is instructed to execute.

The scanner controller 172 controls the scanner 103 based on the app executed by the controller 170. The printing controller 173 controls the printer 130 based on the app executed by the controller 170. The communication controller 174 controls the communication section 102. The communication controller 174 is connected with a facsimile apparatus which is a communication destination and transmits the image information based on the app executed by the controller 170. The image information to be transmitted is, for example, an image read by the scanner 103.

The home screen management section 175 manages the MFP setting information and the home screen management information stored in the home screen information storage section 161. The home screen management section 175 determines whether to display the app button for the installed app on the individual home screen for each user based on a condition stored in the storage section 160. For example, the MFP setting information, or both the MFP setting information and the user information are used as the condition. Alternatively, the home screen management section 175 determines whether to display the app button on the individual home screen for each user based on the setting of the metadata of the installed app. The home screen management section 175 updates the home screen management information such that the app button determined to be displayed is contained in the individual home screen. The home screen management section 175 may determine whether to display the app button of the installed app on the shared home screen as in the case of the user individual home screen. The home screen management section 175 updates the home screen management information such that the app button determined to be displayed is contained in the shared home screen.

The user information management section 176 manages the user information stored in the user information storage section 162. The app information management section 177 installs the app relating to the scanner 103 or the printer 130 using the app package stored in the app information storage section 163. When the app is installed, the app information management section 177 may generate unique app identification information in the image processing apparatus 100 and assign the app identification information to the app package.

The shared home screen and the individual home screen displayed on the touch panel by the panel controller 171 are described with reference to FIG. 3 to FIG. 5. In these figures, an example is shown in which six apps including copy apps 1 to 3 and scan apps 1 to 3 are installed in the image processing apparatus 100.

Figure 3:
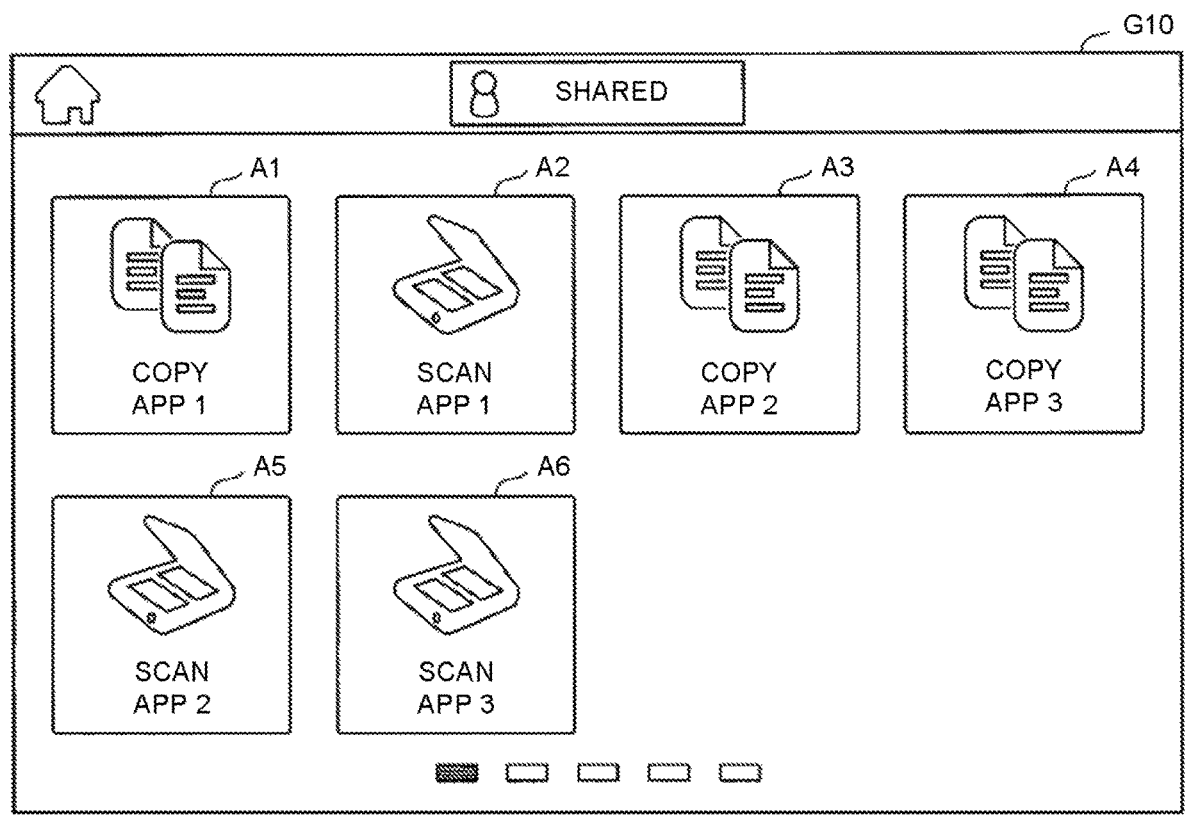
FIG. 3 is a diagram illustrating a display example of a shared home screen.

FIG. 3 is a diagram illustrating a display example of a shared home screen G10. In the shared home screen G10 shown in FIG. 3, an app button A1 indicating a copy app 1, an app button A2 indicating a scan app 1, an app button A3 indicating a copy app 2, an app button A4 indicating a copy app 3, an app button A5 indicating a scan app 2, and an app button A6 indicating a scan app 3 are displayed. The user can use six apps by using the shared home screen G10. The user presses any one of the app buttons A1 to A6 which indicates the app the user wants to use. The controller 170 executes an app corresponding to the pressed app button, and displays the execution screen of the app on the touch panel.

Figure 4:
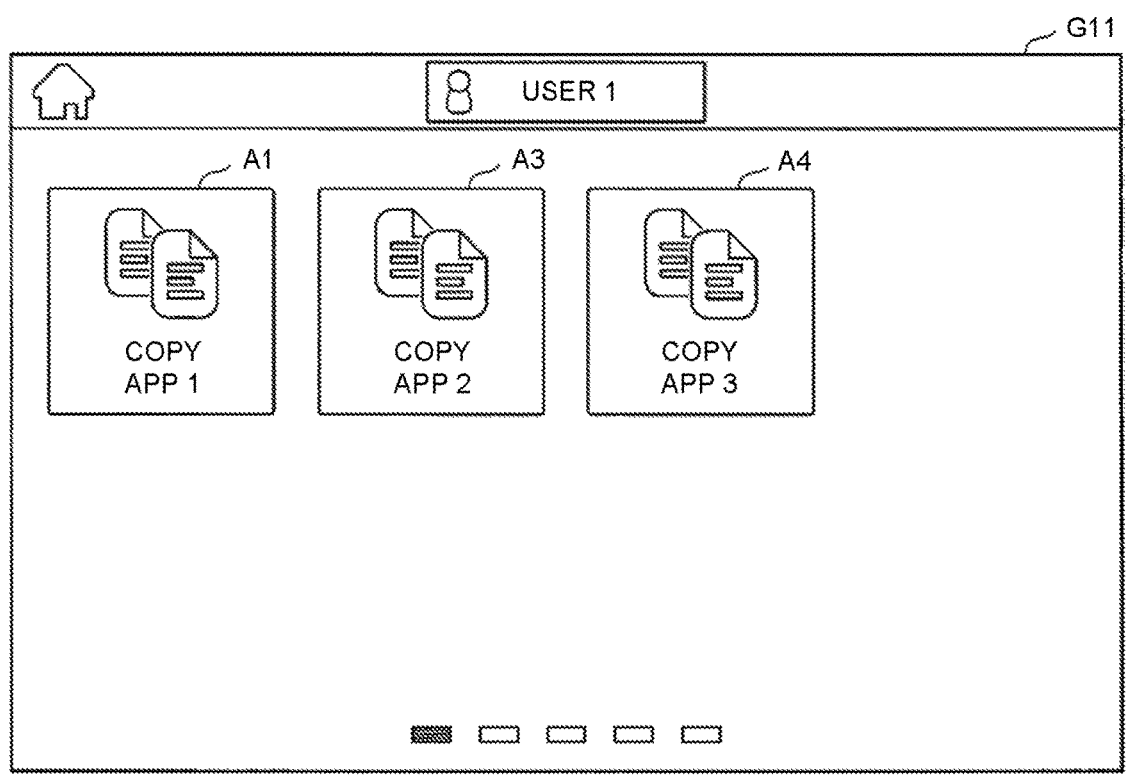
FIG. 4 is a diagram illustrating a display example of an individual home screen.

FIG. 4 is a diagram illustrating a display example of the individual home screen G11 of a user 1. In the individual home screen G11 of the user 1, the app button A1 indicating the copy app 1, the app button A3 indicating the copy app 2, and the app button A4 indicating the copy app 3 are displayed. The individual home screen G11 is different from the shared home screen G10 shown in FIG. 3 in the registered state of the app button. The user 1 can use three apps by using the individual home screen G11.

Figure 5:
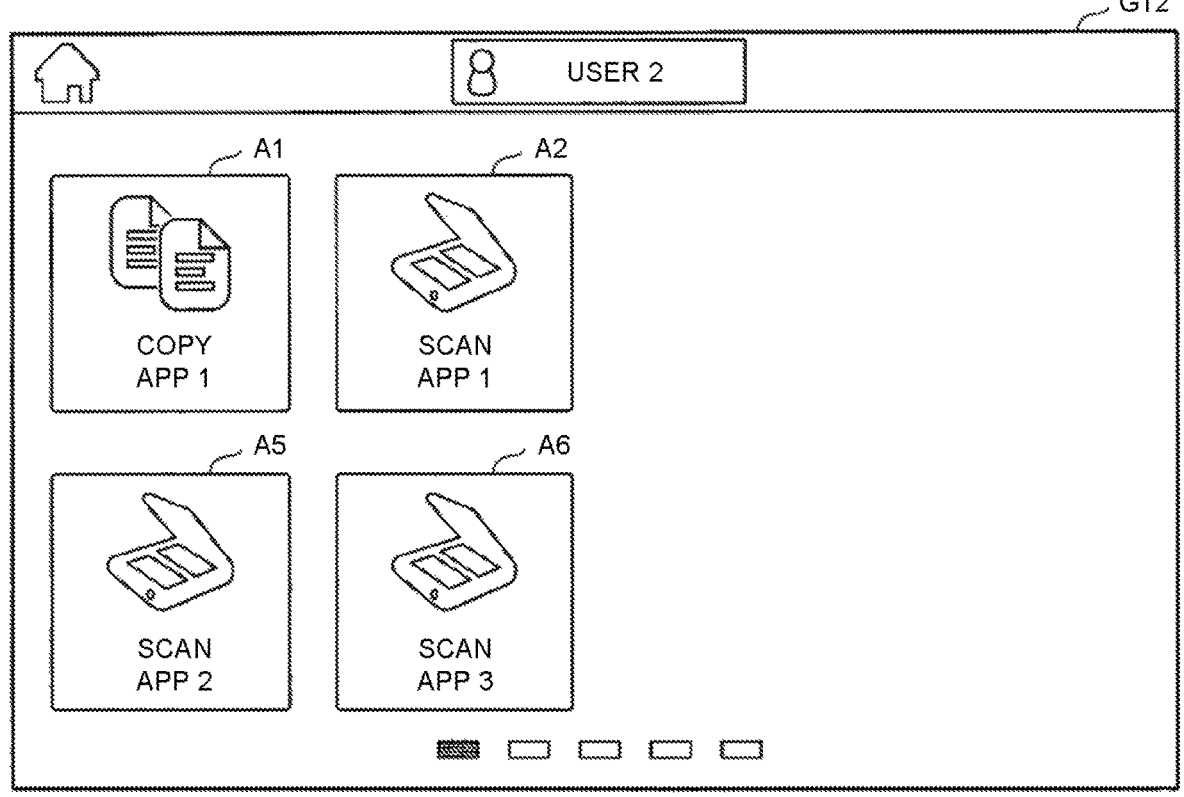
FIG. 5 is a diagram illustrating a display example of the individual home screen.

FIG. 5 shows an example of an individual home screen G12 of a user 2. In the individual home screen G12 of the user 2, the app button A1 indicating the copy app 1, the app button A2 indicating the scan app 1, the app button A5 indicating the scan app 2, and the app button A6 indicating the scan app 3 are displayed. The individual home screen G12 is different from the shared home screen G10 shown in FIG. 3 and the individual home screen G11 shown in FIG. 4 in the registered state of the app button. In this manner, the registration and arrangement of the app button can be customized freely for each user of the image processing apparatus 100.

Figure 6:
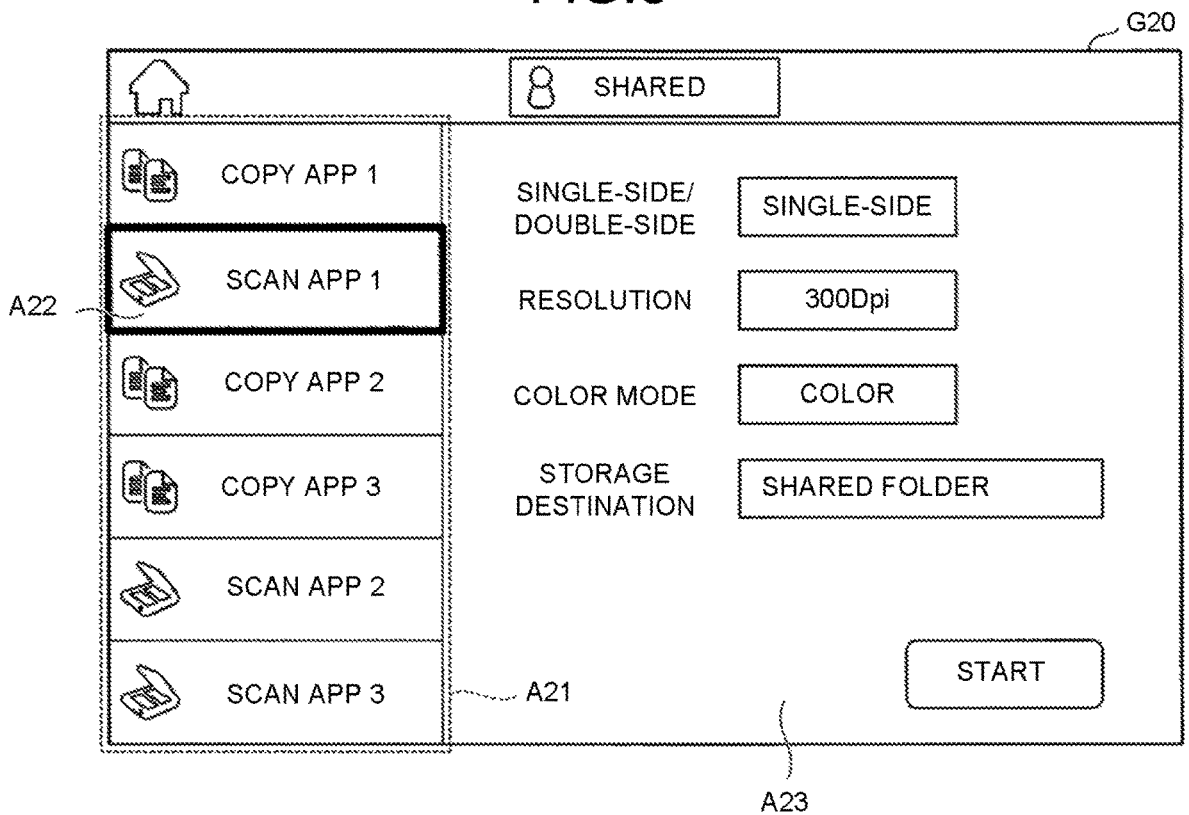
FIG. 6 is a diagram illustrating a display example of the shared home screen.
Figure 7:
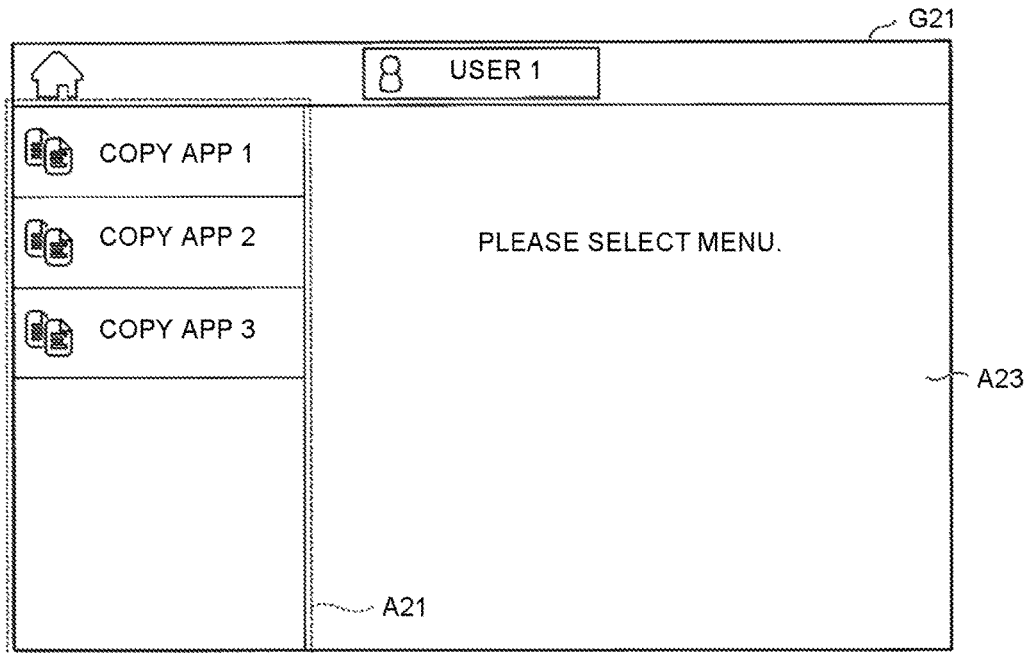
FIG. 7 is a diagram illustrating a display example of the individual home screen.

In FIG. 3 to FIG. 5, the app button is registered as the execution instruction image on the home screen. As shown in FIG. 6 and FIG. 7, the panel controller 171 may display a menu of the app that can instruct the execution on the home screen as the execution instruction image.

FIG. 6 shows a display example of a shared home screen G20. In a menu display area A21 of the shared home screen G20, a catalog of names of the six apps, i.e., the copy app 1, the scan app 1, the copy app 2, the copy app 3, the scan app 2, and the scan app 3 is displayed. In the menu display, an app button image of a small size is displayed adjacent to the name of the app. In the menu display area A21, the user presses a display area where the name of the app to be used is displayed. For example, when the user presses the display area A22 where the name of the scan app 1 is displayed, the controller 170 starts executing the scan app. The panel controller 171 displays the execution screen of the scan app 1 in an app execution screen display area A23 adjacent to the menu display area A21.

FIG. 7 shows a display example of an individual home screen G21 of the user 1. In the menu display area A21 of the individual home screen G21, a catalog of names of three apps including the copy app 1, the copy app 2 and the copy app 3 is displayed. If the user presses the display area including the name of the app to be used in the menu display area A21, the controller 170 starts executing the app. The panel controller 171 displays the app execution screen in the app execution screen display area A23.

In the case of the home screen display shown in FIG. 6 and FIG. 7, the image processing apparatus 100 displays the app execution screen while displaying the menu of the apps. Therefore, the user can continuously instruct execution of different apps without switching the screen.

Figure 8:
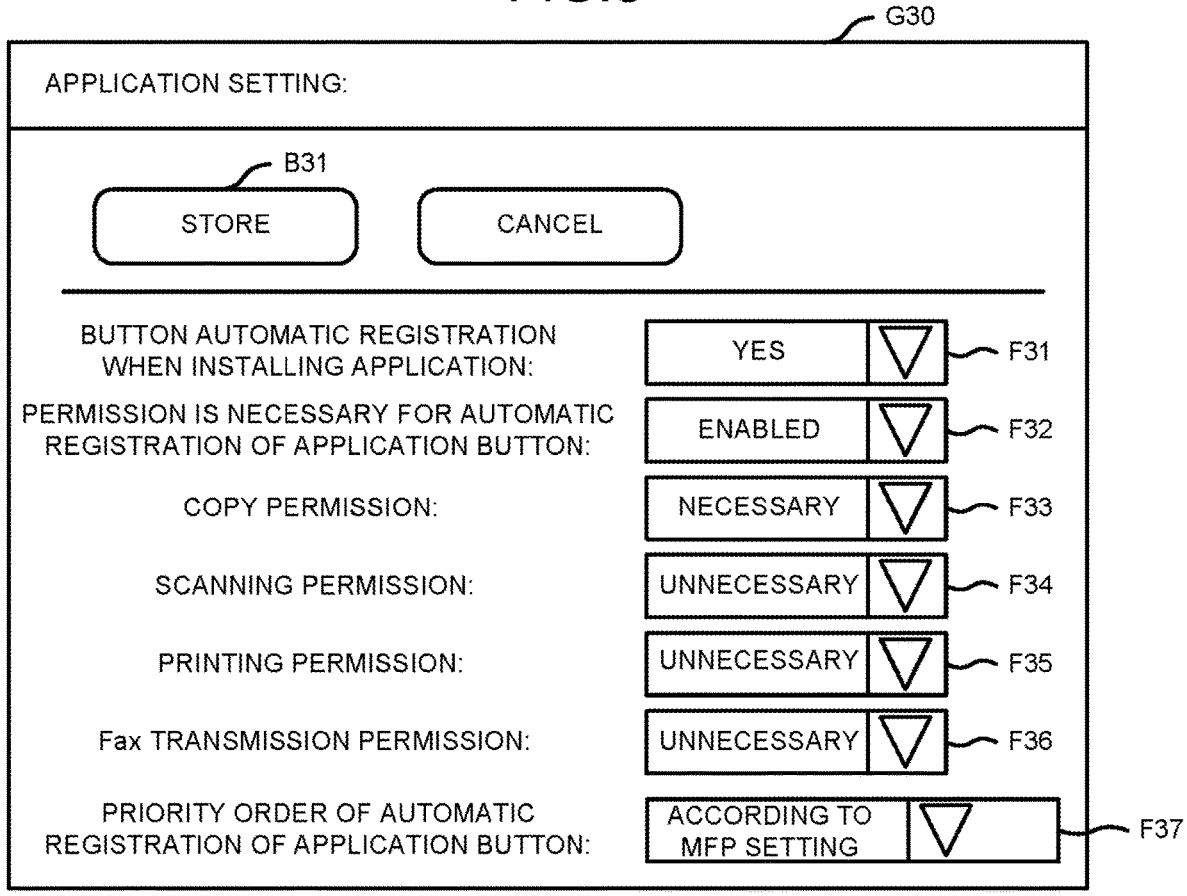
FIG. 8 is a diagram illustrating a display example of a MFP setting input screen.

FIG. 8 is a diagram illustrating a display example of a MFP setting input screen G30. The panel controller 171 displays the MFP setting input screen G30 shown in FIG. 8 on the touch panel. The MFP setting input screen G30 includes setting input fields F31 to F37. In the setting input field F31, it is possible to select whether to automatically register the app button at the time of installing the app from a pull-down menu. "Yes" is selected if the automatic registration of the app button is performed, and "no" is selected if the automatic registration of the app button is not performed. In the setting input field F32, it is possible to select whether to set the setting that the permission is required for a target person for whom the app button is automatically registered on the home screen to be "enabled" or "disabled" from a pull-down menu.

In the setting input field F33, it is possible to select whether the automatic registration of the app button on the home screen of the user having a copy permission is "necessary" or "unnecessary" from the pull-down menu. In the setting input field F34, it is possible to select whether the automatic registration of the app button on the home screen of the user having a scanning permission is "necessary" or "unnecessary" from the pull-down menu. In the setting input field F35, it is possible to select whether the automatic registration of the app button on the home screen of the user having a printing permission is "necessary" or "unnecessary" from the pull-down menu. In the setting input field F36, it is possible to select whether the automatic registration of the app button on the home screen of the user having a Fax transmission permission is "necessary" or "unnecessary" from the pull-down menu.

In the setting input field F37, it is possible to select a priority order of the automatic registration of the app button from the pull-down menu. "According to the MFP setting" when the MFP setting is prioritized is selected, and "according to application setting" is selected if the setting of the metadata of the app is prioritized.

The administrator of the image processing apparatus 100 inputs the MFP setting information using the setting input fields F31 to F37, and presses a storage button B31. The home screen management section 175 stores the MFP setting information indicating the contents set in the setting input fields F31 to F37 in the home screen information storage section 161.

FIG. 9 is a diagram illustrating a setting example of the user information. The user information indicates whether or not the administrator and each user have the copy execution permission, the scanning execution permission, the printing execution permission, and the Fax transmission execution permission, respectively. "O" means that he or she has the permission, and "X" indicates that he or she does not have permission. The user information management section 176 stores the user information input by the administrator using the user interface section 101 in the user information storage section 162. If it is regarded that the administrator has all the execution permission, the information relating to the permission of the administrator may not contained in the user information.

FIG. 10 is a diagram illustrating an example of the setting of the metadata of an app. In the example shown in FIG. 10, the app attribute is described in the metadata of a XML (Extensible Markup Language) file. "AppId" indicates the app identification information. "AppName" indicates the name of the app. "AppVersion" indicates the version of the app. "AppCreatedDate" indicates the creation date of the app. The "AppSummary" shows a summary of the app. "AppButtonName 1", "AppButtonName 2" indicate app button names. "IsAutoButtonRegistration" and "PermissionForButtonRegistration" indicate registration attribute of the app button. The registration attribute of the app button indicates a condition relating to the registration of the app button.

"IsAutoButtonRegistration" indicates an attribute about whether to automatically register the app button at the time of installing the application. "True" is described when the automatic registration of the app button is performed, and "False" is described when the automatic registration is not performed.

"PermissionForButtonRegistration" indicates whether the automatic registration of the app button on the home screen of the user having the execution permission is "necessary" or "unnecessary" for each of the copy, the scanning, the printing, and the Fax transmission. "True" is described in "Copy" if the automatic registration of the app button on the home screen of the user having the copy permission is "necessary", and "False" is described if "unnecessary". "True" is described in "Scan" if the automatic registration of the app button on the home screen of the user having the scanning permission is "necessary", and "False" is described if "unnecessary". "True" is described in "Print" if the automatic registration of the app button on the home screen of the user having the printing permission is "necessary", and "False" is described if "unnecessary". "True" is described in "SendFax" if the automatic registration of the app button on the home screen of the user having the Fax transmission permission is "necessary", and "False" is described if "unnecessary".

The registration attribute of the app button may further include information about whether to enable or disable the setting that the permission is required for the target person for whom the app button is automatically registered. The setting of "PermissionForButtonRegistration" is enabled if the setting that the permission is required for the target person for whom the app button is automatically registered on the home screen is necessary.

Figure 11:
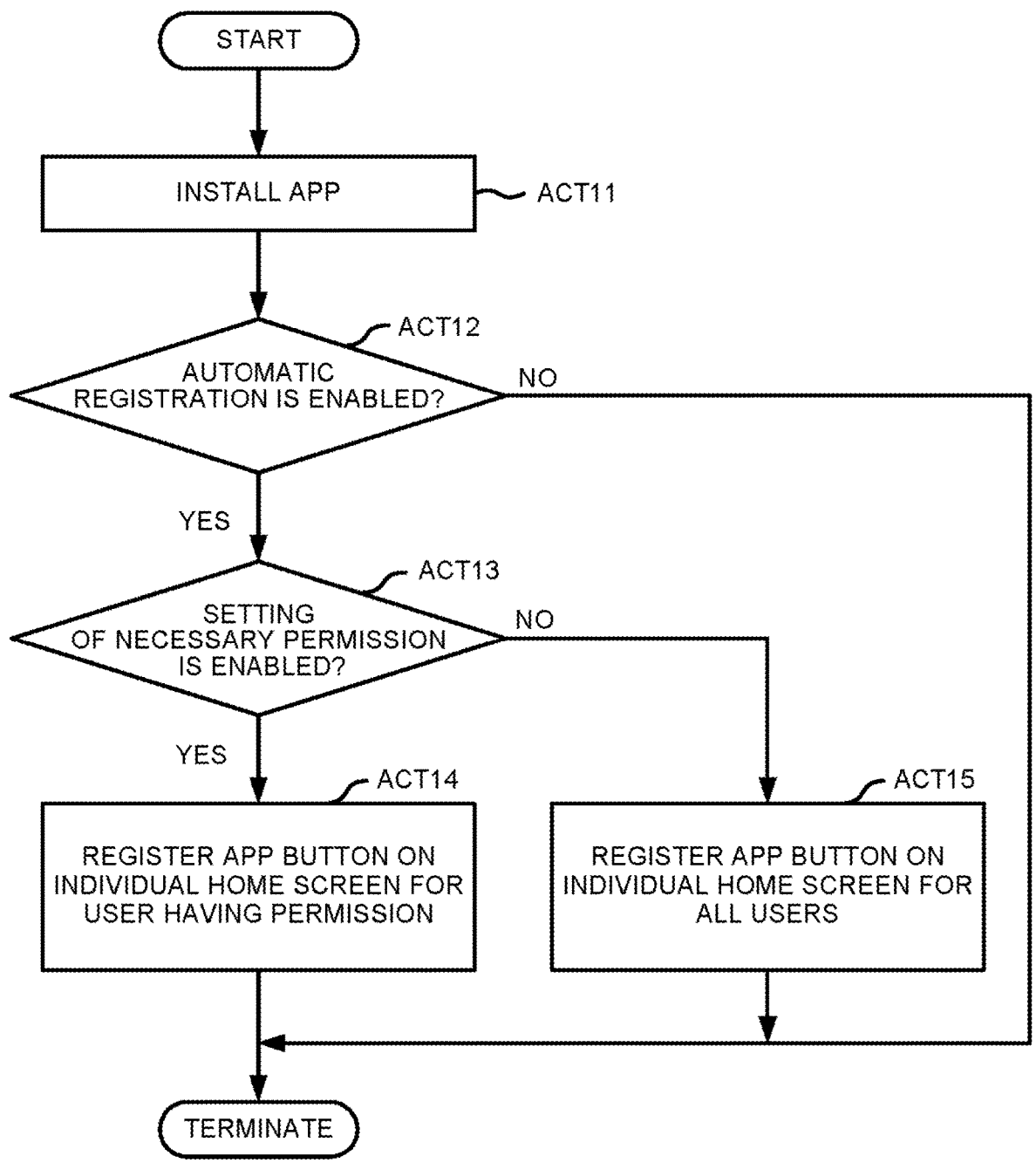
FIG. 11 is a flowchart for depicting an automatic registration process of an app button.

FIG. 11 is a flowchart illustrating an example of an app button automatic registration process. FIG. 11 shows a process by the controller 170 when the attribute information relating to the registration of the app button is not contained in the app package.

The app information management section 177 installs the app by using the app package stored in the app information storage section 163 (ACT 11). After the app is installed, the home screen management section 175 reads out the MFP setting information from the home screen information storage section 161. The home screen management section 175 determines whether or not the setting of the automatic registration of the app button is enabled based on the MFP setting information (ACT 12). If the home screen management section 175 determines that the setting of the automatic registration of the app button is disabled (No in ACT 12), the home screen management section 175 terminates the process without registering the app button.

If the home screen management section 175 determines that the setting of the automatic registration of the app button is enabled (Yes in ACT 12), the home screen management section 175 executes the process in ACT 13. Based on the MFP setting information, the home screen management section 175 determines whether or not the setting that the permission is required for the target person for whom the app button is automatically registered on the home screen is enabled (ACT 13). If the home screen management section 175 determines that the setting is enabled (Yes in ACT 13), the home screen management section 175 registers the app button on the shared home screen and the individual home screen of each user having the permission (ACT 14).

Specifically, the process in ACT 14 is performed as follows. The home screen management section 175 acquires the permission information of each user from the user information stored in the user information storage section 162. If it is set that the copy permission is "necessary" in the MFP setting information, the home screen management section 175 selects a user having the copy execution permission as the target person for whom the app button is registered. If it is set that the scanning permission is "necessary" in the MFP setting information, the home screen management section 175 selects a user having the scanning execution permission as the target person for whom the app button is registered. If it is set that the printing permission is "necessary" in the MFP setting information, the home screen management section 175 selects a user having the printing execution permission as the target person for whom the app button is registered. If it is set that the Fax transmission permission is "necessary" in the MFP setting information, the home screen management section 175 selects a user having the Fax transmission execution permission as the target person for whom the app button is registered.

The home screen management section 175 registers the app button of the installed app on the shared home screen and the individual home screen of each user who is the target person for whom the app button is registered. Therefore, the home screen management section 175 acquires the app identification information, the app image identification information, and the app button name of the installed app from the app package. The home screen management section 175 determines the app button display position in each of the shared home screen and the individual home screen of each user who is the target person for whom the app button is registered. The home screen management section 175 additionally registers the app identification information, the app button display position information, the app image identification information and the app button name in association with each of the home screen management information of the shared home screen and the home screen management information of the individual home screen of each user who is the target person for whom the app button is registered.

On the other hand, if the home screen management section 175 determines that the setting that the permission is required for the target person for whom the app button is registered on the home screen is disabled (No in ACT 13), the home screen management section 175 registers the app button on the shared home screen and the individual home screen of each user (ACT 15). The home screen management section 175 updates the home screen management information of the shared home screen and the home screen management information of the individual home screen of each user like the process in Act 14 if it is considered that all the users are the target person for whom the app button is registered.

In ACT 14, similarly to the user, the home screen management section 175 also determines whether or not the administrator has the permission required for the registration of the app button, and if the administrator has the permission, the home screen management section 175 may determine the administrator as the target person for whom the app button is registered. The home screen management section 175 registers the app button on the shared home screen if the administrator is determined as the target person for whom the app button is registered.

In ACT 14, in addition to the permission of the user, the type of the app may be further determined to select the user who is the target person for whom the app button is registered. In this case, the information relating to the type of the app is set in the metadata of the app. The app includes a copy related app, a scanning related app, a printing related app, and a Fax transmission related app. The home screen management section 175 reads out the information relating to the type of the app from the metadata of the installed app. If the administrator installs an app in the image processing apparatus 100, the information relating to the type of the app may be input through the user interface section 101.

If it is set that the copy permission is "necessary" in the MFP setting information and the type of the app is the copy related app, the home screen management section 175 selects the user having the copy execution permission as the target person for whom the app button is registered. If it is set that the scanning permission is "necessary" in the MFP setting information and the type of the app is the scanning related app, the home screen management section 175 selects the user having the scanning execution permission as the target person for whom the app button is registered. If it is set that the printing permission is "necessary" in the MFP setting information and the type of the app is the printing related app, the home screen management section 175 selects the user having the printing execution permission as the target person for whom the app button is registered. If it is set that the Fax transmission permission is "necessary" in the MFP setting information and the type of the app is the Fax transmission related app, the home screen management section 175 selects the user having the Fax transmission execution permission as the target person for whom the app button is registered.

Figure 12:
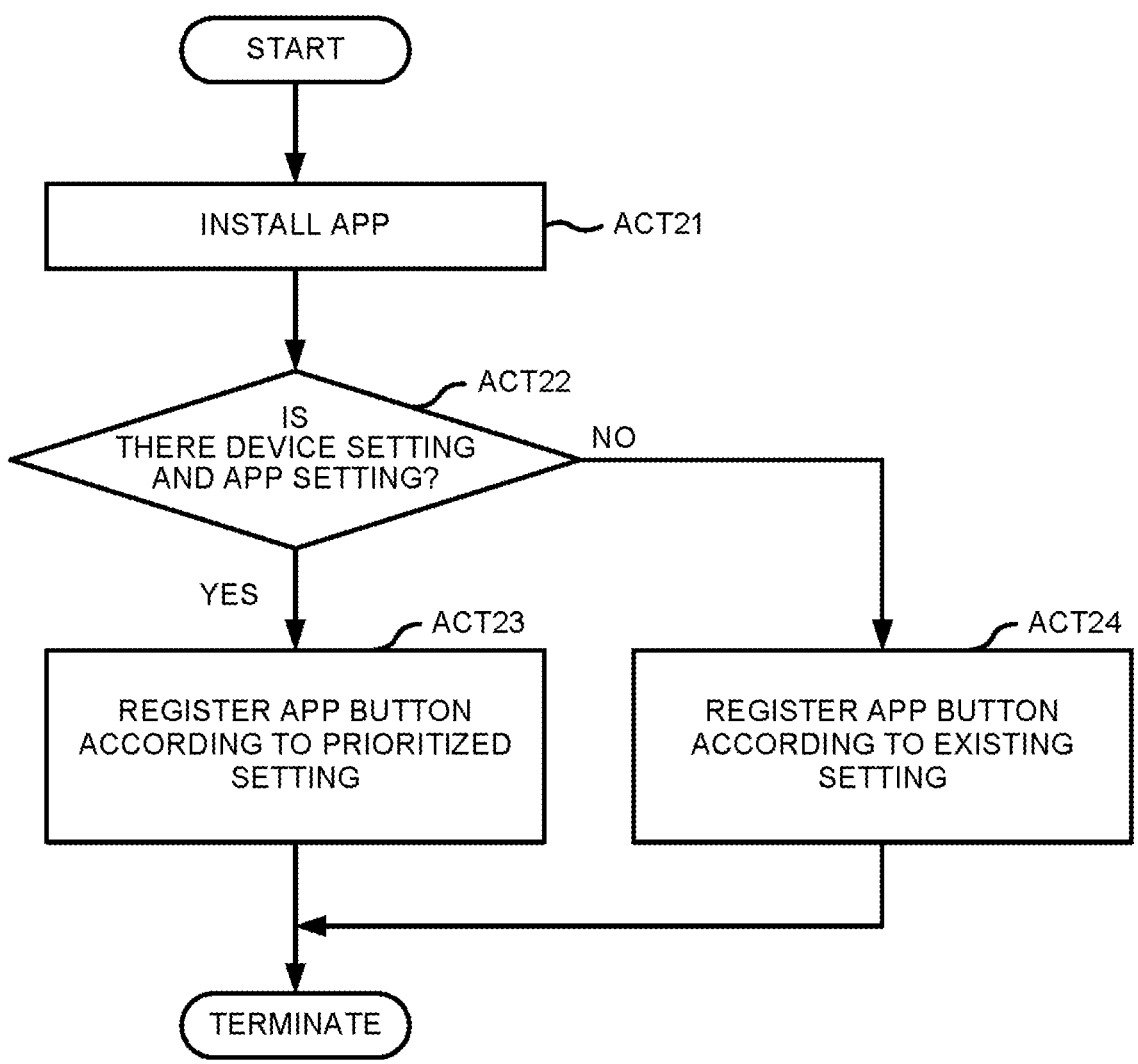
FIG. 12 is a flowchart for depicting a priority process of MFP setting and app setting.

FIG. 12 is a flowchart illustrating an example of a priority process of the MFP setting and the app setting. FIG. 12 shows the process by the controller 170 when the registration attribute of the app button is set in the app package.

The app information management section 177 installs the app using the app package stored in the app information storage section 163 (ACT 21). Next, the home screen management section 175 determines whether or not the MFP setting information is set and whether or not the registration attribute of the app button is set in the metadata of the installed app (ACT 22).

If the home screen management section 175 determines that the both are set (Yes in ACT 22), based on the priority order of the automatic registration of the app button set in the MFP setting information, the home screen management section 175 determines which one of the MFP setting and the setting of the registration attribute of the app button is prioritized. The home screen management section 175 executes the automatic registration of the app button according to the setting which is prioritized (ACT 23).

Specifically, the home screen management section 175 performs the process subsequent to ACT 12 in FIG. 11 when a priority order of the automatic registration of the app button is "according to the MFP setting". The home screen management section 175 uses the registration attribute of the app button to replace the MFP setting information if the priority order of the automatic registration of the app button is "according to the application setting", and performs the process subsequent to ACT 12 in FIG. 11.

On the other hand, if the home screen management section 175 determines that there is only one of the MFP setting and the setting of the registration attribute of the app button (No in ACT 22), the home screen management section 175 executes the automatic registration of the app button according to the existing setting (ACT 24). Specifically, the home screen management section 175 performs the process subsequent to ACT 12 in FIG. 11 if there is the MFP setting and there is no setting of the registration attribute of the app button in the metadata of the app. If there is no MFP setting but there is the setting of the registration attribute of the app button in the metadata of the app, the home screen management section 175 uses the registration attribute of the app button instead of the MFP setting information to perform the process subsequent to ACT 12 in FIG. 11.

The home screen management section 175 operates as follows in the case of performing the process subsequent to ACT 12 in FIG. 11 by using the registration attribute of the app button set in the metadata of the app. In ACT 12, the home screen management section 175 determines whether or not the setting of the automatic registration of the app button is enabled based on a setting value of "IsAutoButtonRegistration" in the metadata. In ACT 13, the home screen management section 175 reads out, from the metadata, the information about whether or not the setting that the permission is required for the target person for whom the app button is automatically registered on the home screen is enabled. The home screen management section 175 executes the process in ACT 14 when the metadata does not contain the information about whether or not the setting that the permission is required for the automatic registration of the app button is enabled. In the ACT 14, the home screen management section 175 determines whether or not the copy permission, the scanning permission, the printing permission, and the Fax transmission permission are necessary, respectively, based on the setting values of "Copy", "Scan", "Print" and "SendFax".

Through the above, by setting the MFP setting information and the user information in the image processing apparatus 100, the administrator can automatically register the execution instruction image of the app installed in the image processing apparatus 100 on the shared home screen and the individual home screen of each user.

According to at least one embodiment described above, by having the controller 170, if the MFP installs the app, among the plurality of users using the MFP, it is possible to automatically register the instruction execution image on the individual home screen of the user who needs the app.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
   at least one of an image forming device configured to form an image on a sheet or an image reader configured to read an image on the sheet;
   a storage configured to store individual home screen information for each user of a plurality of users, the individual home screen being a home screen for individual use by each user of an application program relating to the image forming device or the image reader;
   a display configured to display the individual home screen; and
   a controller configured to
      install the application program relating to the image forming device or the image reader,
      determine a user to register an execution instruction image for including an execution instruction of the installed application program in the individual home screen information based on information relating to permission of the user;
      register the execution instruction image in the individual home screen information of the determined user;
      update the individual home screen information stored in the storage to be individual home screen information in which the execution image is registered; and
      display the individual home screen based on the individual home screen information stored in the storage.

2. The information processing apparatus according to claim 1, wherein
   the storage is configured to store a setting for whether or not automatic registration is necessary; and
   the controller is configured to determine the user who registers the execution instruction image in the individual home screen information based on the information relating to the permission of the user, in a case of the setting being that automatic registration is necessary.

3. The image processing apparatus according to claim 2, wherein the storage is configured to store the information relating to the permission of the user.

4. The image processing apparatus according to claim 1, wherein
the controller is configured to receive the information relating to the permission of the user.

5. The image processing apparatus according to claim 1, wherein
the application program includes the information relating to the permission of the user in attribute data of the application program.

6. The image processing apparatus according to claim 5, wherein
the storage is configured to store the information relating to the permission of the user and information relating to a priority setting; and
the controller is configured to determine the user who registers the execution instruction image in the individual home screen information based on the information relating to the permission of the user stored in the storage or the information relating to the permission of the user in the application program according to the information relating to the priority setting.

7. The image processing apparatus according to claim 1, wherein
the information relating to the permission of the user includes permission information for executing the application program.

8. An image processing method, comprising:
storing, in a storage, individual home screen information for each user of a plurality of users, the individual home screen being a home screen for individual use by each user of an application program relating to at least one of an image forming device configured to form an image on a sheet or an image reader configured to read an image on the sheet;
controlling, via a controller, installation of the application program relating to the image forming device or the image reader;
determining a user to register an execution instruction image for including an execution instruction of the installed application program in the individual home screen information based on information relating to permission of the user;
registering the execution instruction image in the individual home screen information of the determined user;
updating the individual home screen information stored in the storage to be individual home screen information in which the execution image is registered; and
displaying, on a display, the individual home screen based on the individual home screen information stored in the storage.

9. The information processing method according to claim 8, further comprising:
storing, in the storage, a setting as to whether or not automatic registration is necessary; determining the user who registers the execution instruction image in the individual home screen information based on the information relating to the permission of the user, in a case of the setting being that automatic registration is necessary.

10. The image processing method according to claim 9, further comprising:
storing the information relating to the permission of the.

11. The image processing method according to claim 8, further comprising:
receiving the information relating to the permission of the user.

12. The image processing method according to claim 8, further comprising:
application program includes the information relating to the permission of the user.

13. The image processing method according to claim 12, further comprising:
storing, in the storage, the information relating to the permission of the user and information relating to a priority setting; and
determining the user who registers the execution instruction image in the individual home screen information based on the information relating to the permission of the user stored in the storage or the information relating to the permission of the user in the application program according to the information relating to the priority setting.

14. The image processing method according to claim 8, wherein
the information relating to the permission of the user includes permission information for executing the application program.

\* \* \* \* \*